Oct. 14, 1969 M. A. SLAATS ET AL 3,472,110

PLAYER PIANO

Filed Dec. 11, 1964 8 Sheets-Sheet 1

INVENTORS
ROGER WEST
MATHEW A. SLAATS

BY Toulmin & Toulmin

ATTORNEYS

PLAYER PIANO

Filed Dec. 11, 1964

INVENTORS
ROGER WEST
MATHEW A. SLAATS
BY
Toulmin & Toulmin
ATTORNEYS

Oct. 14, 1969 M. A. SLAATS ET AL 3,472,110

PLAYER PIANO

Filed Dec. 11, 1964 8 Sheets-Sheet 3

INVENTORS
ROGER WEST
MATHEW A. SLAATS
BY Toulmin & Toulmin

ATTORNEYS

PLAYER PIANO

Filed Dec. 11, 1964 8 Sheets-Sheet 4

INVENTORS
ROGER WEST
MATHEW A. SLAATS
BY Toulmin & Toulmin
ATTORNEYS

INVENTORS
ROGER WEST
MATHEW A. SLAATS
BY Toulmin & Toulmin

ATTORNEYS

PLAYER PIANO

Filed Dec. 11, 1964 8 Sheets-Sheet 6

INVENTORS
ROGER WEST
MATHEW A. SLAATS
BY
Toulmin & Toulmin
ATTORNEYS

INVENTORS
ROGER WEST
MATHEW A. SLAATS
BY Toulmin & Toulmin
ATTORNEYS

INVENTOR
ROGER WEST
MATHEW A. SLAATS
BY Toulmin & Toulmin
ATTORNEYS

United States Patent Office 3,472,110

Patented Oct. 14, 1969

3,472,110

PLAYER PIANO

Mathew A. Slaats and Roger T. West, Jasper, Ind., assignors to W. W. Kimball Company, Jasper, Ind., a corporation of Delaware Filed Dec. 11, 1964, Ser. No. 418,042
Int. Cl. G10f 1/02
U.S. Cl. 84—42 4 Claims

ABSTRACT OF THE DISCLOSURE

Player piano with pneumatically operated key actuating devices under the control of a perforated tracker bar over which a punched paper roll is drawn, and including a relief valve expression means which controls the force supplied by the striker pneumatics to the hammers.

This invention relates to new and useful improvements in player pianos having a player mechanism which can readily be incorporated into standard piano models.

In recent years, however, there has been renewed interest in player pianos. In an effort to meet this demand in today's competitive market it was necessary to provide a player piano which could be produced in mass production and to maintain a quality unit which could readily be adapted to a line of standard pianos.

An object of this invention is to provide an economical, compact player piano unit which could be readily installed in standard piano models.

Another object of the invention was to provide a player piano unit having improved control over the wind and rewind rollers.

A further object of this invention was to provide an improved construction for maintaining the player roll and tracker bar in proper registration.

A still further object of this invention is to provide a vacuum chest and control valve combination of extreme simplicity and reliability.

Another object of this invention is to provide an economical and efficient loudness control device for the player unit.

A still further object of this invention is to provide for a simplified and compact control arrangement for the player piano unit.

Another object of this invention is to provide for a compact arrangement of the vacuum chests, pneumatics for actuating the keys, and valves for controlling the pneumatics.

These and other objects and advantages will become apparent from the following detailed description and accompanying drawings in which.

Figure 4:
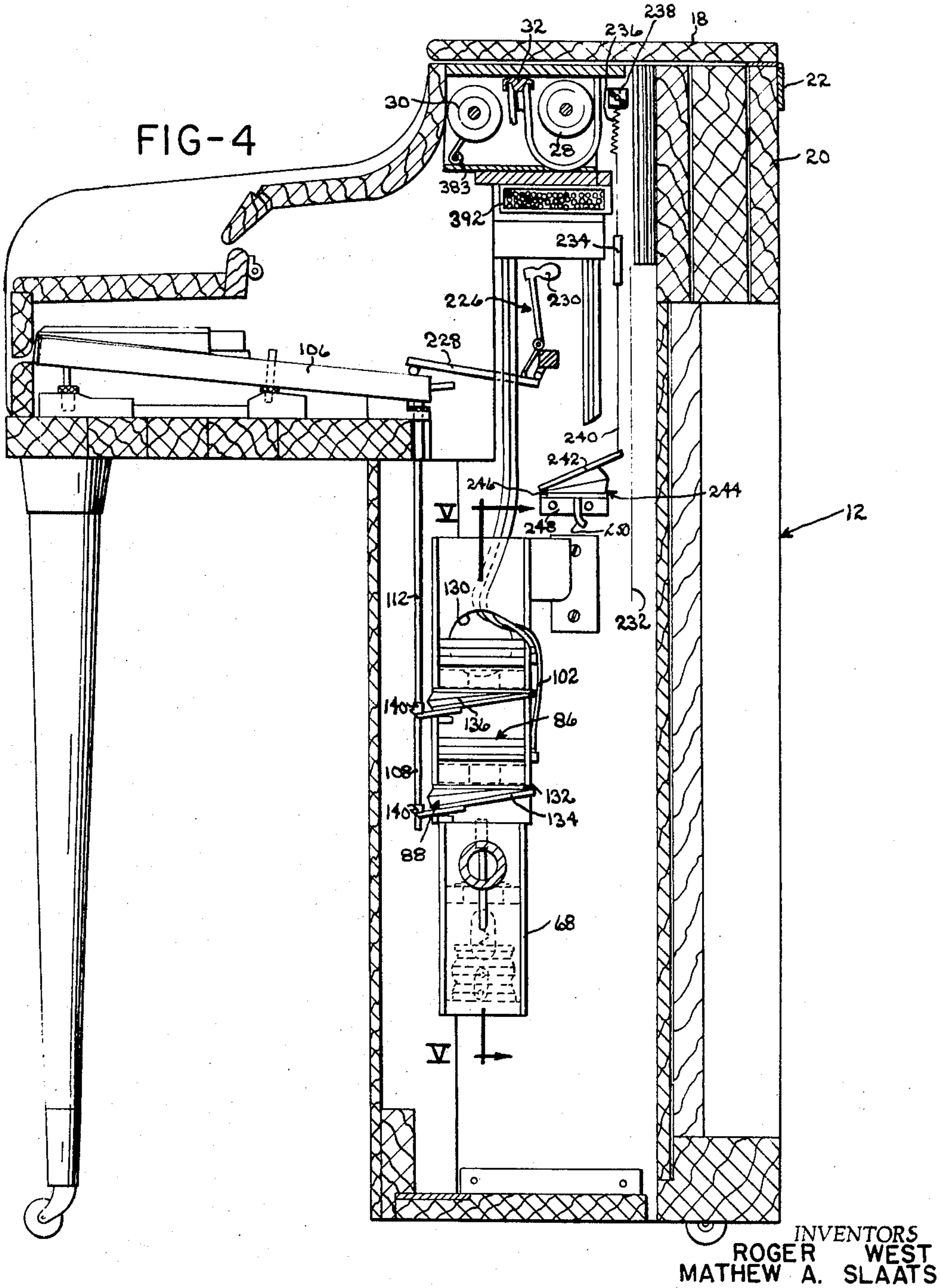
FIGURE 4 is a side view of the invention partly in section showing elements of the player unit.
Figures 4A, 5, 6:
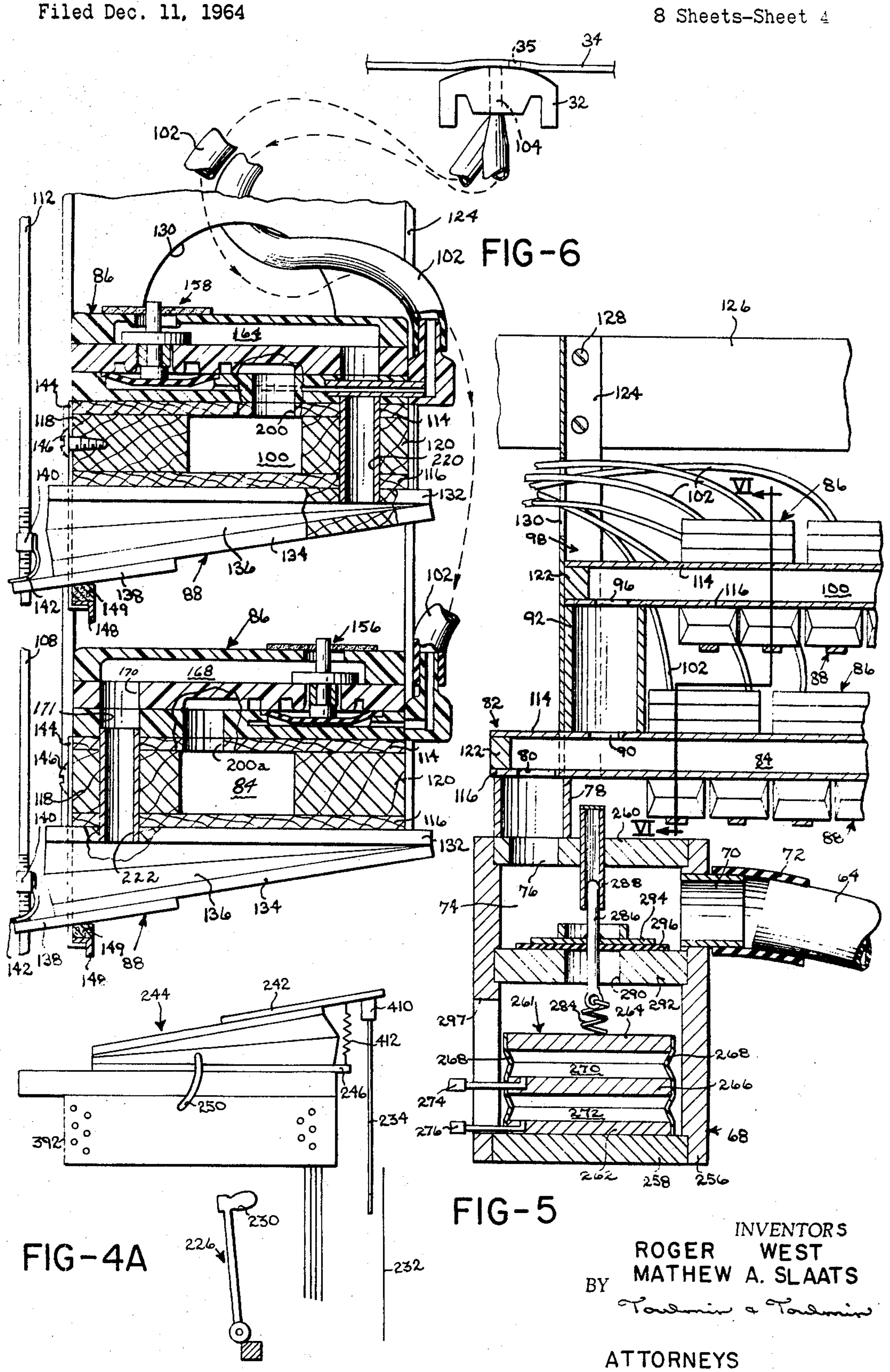

FIGURE 4*a* is a portion of FIGURE 4 showing a modification which the Ukelano attachment may take.

Figure 7:
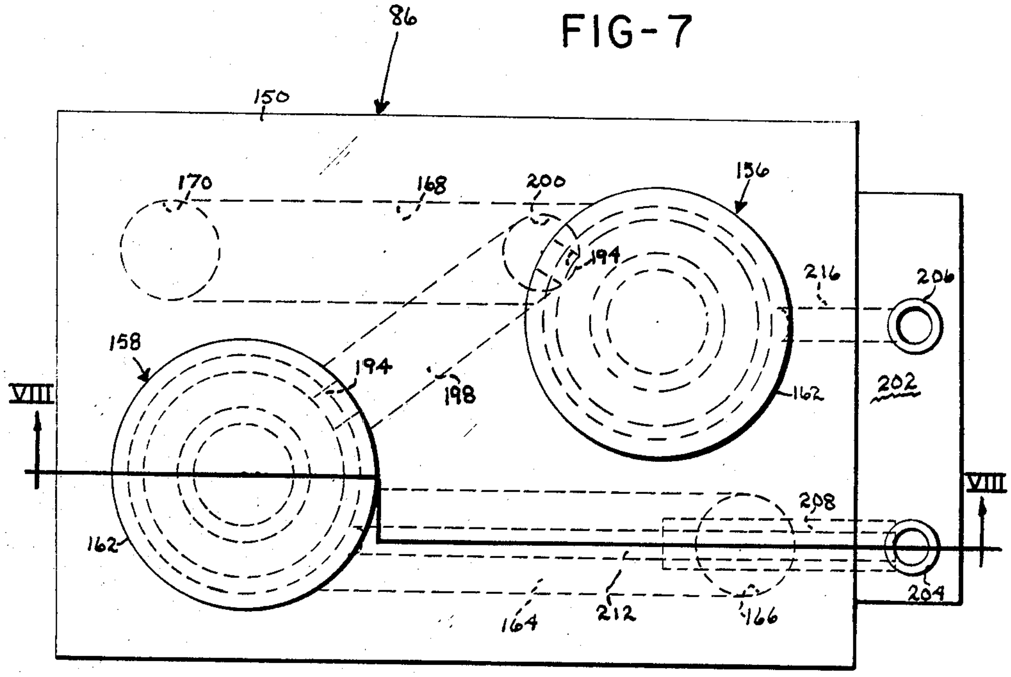
Figure 8:
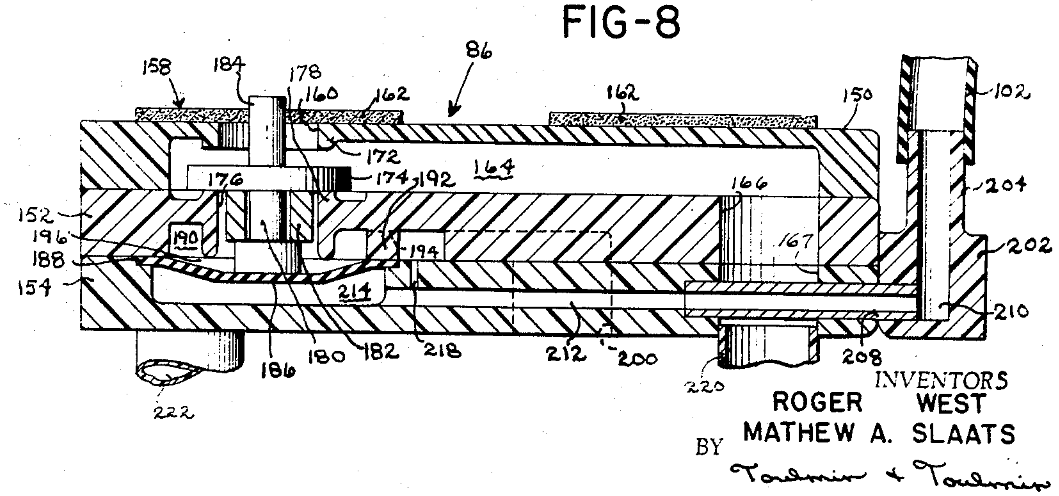
Figure 9:
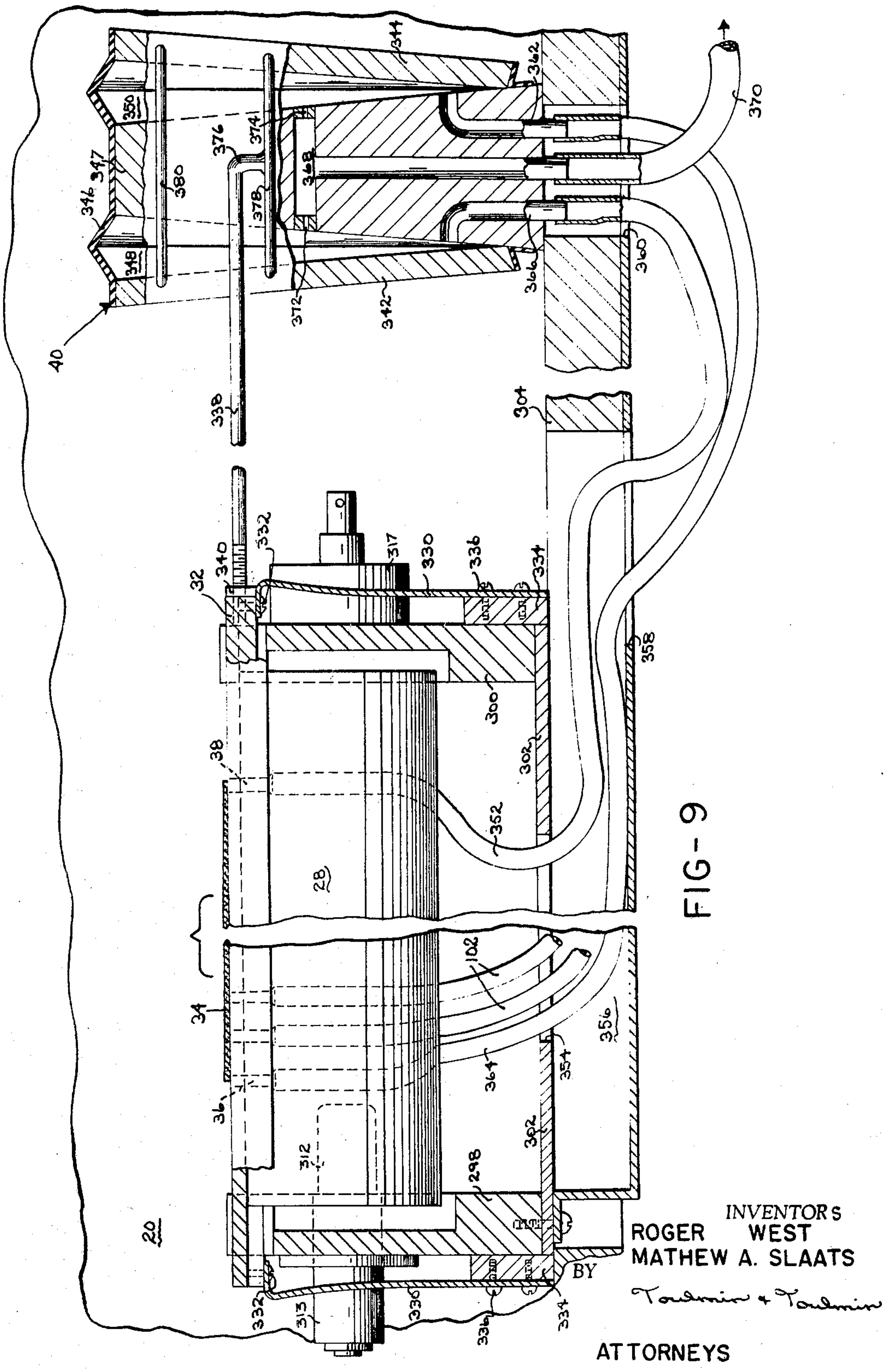
Figure 10:
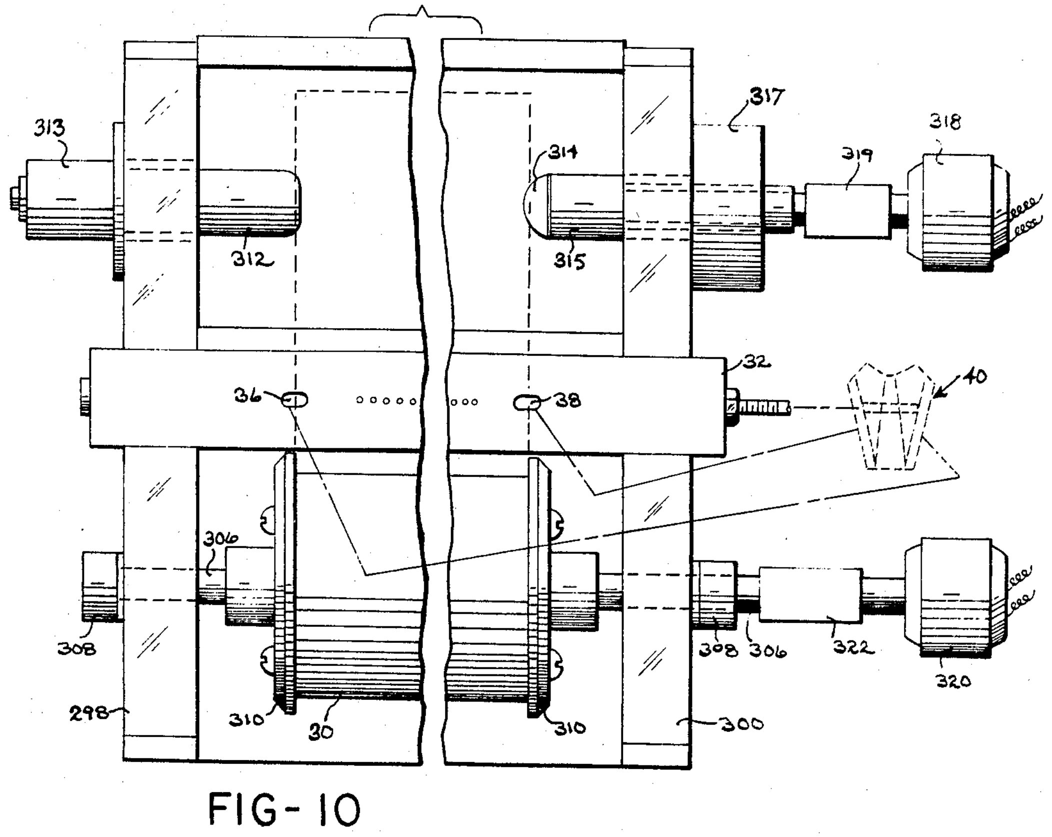
Figure 11:
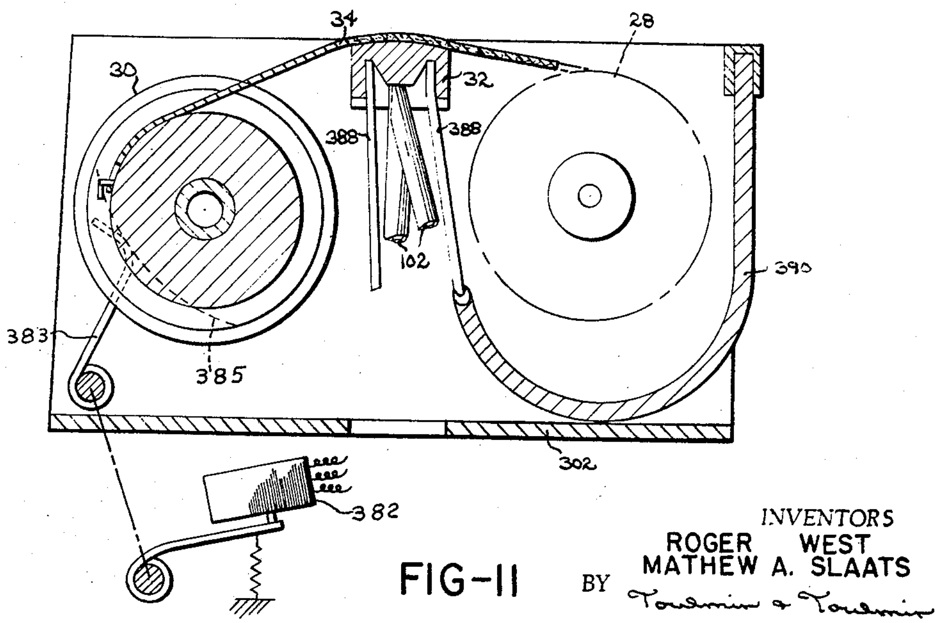
Figure 12:
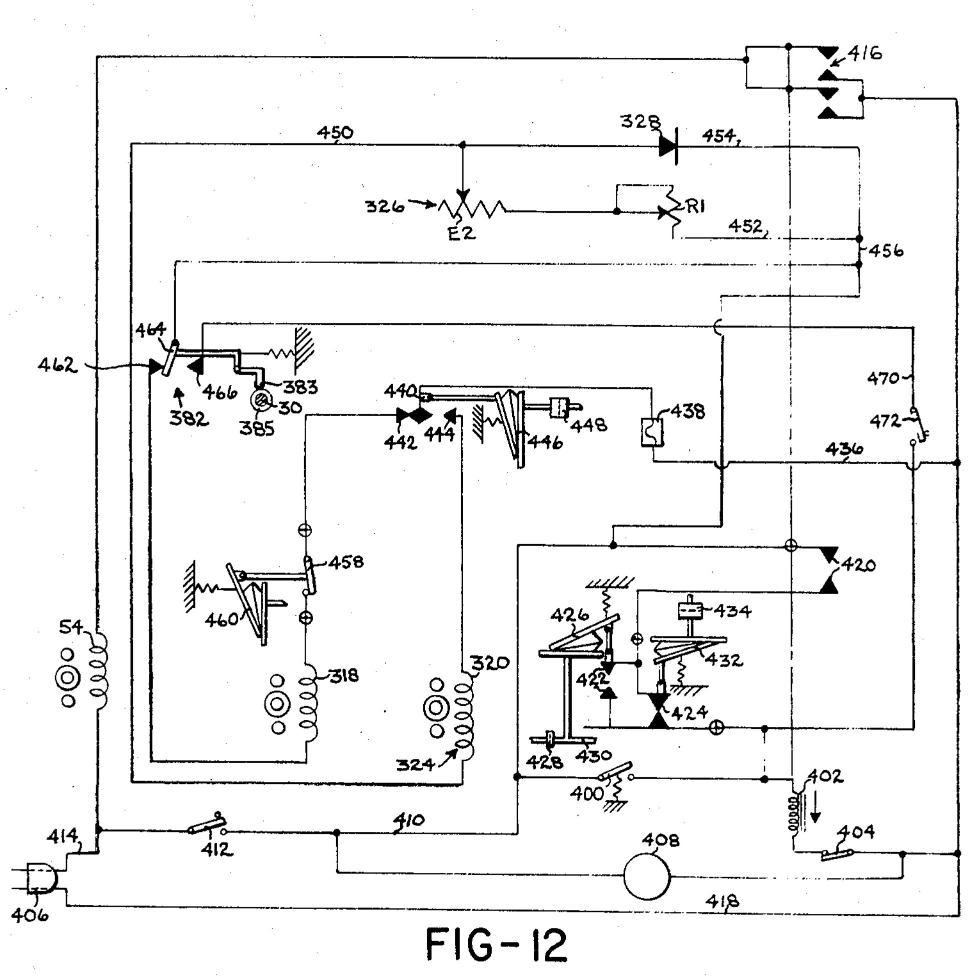
Figure 13:
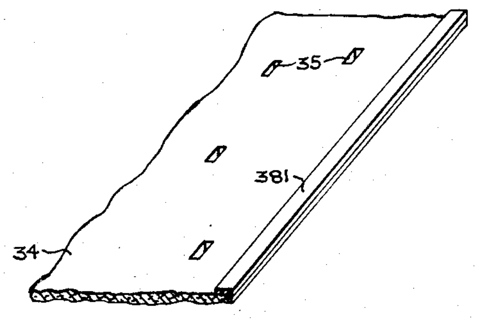

FIGURE 5 is a cross sectional view of the vacuum chests and the loudness control taken along the lines 5—5 of FIGURE 4;

FIGURE 6 is a cross sectional view of the pneumatics, vacuum chests and valves taken along the lines 6—6 of FIGURE 5;

FIGURE 7 is a plan view of the valve unit;

FIGURE 8 is a cross sectional view taken along the lines 8—8 of FIGURE 7;

FIGURE 9 is a cross sectional view of the follower unit for maintaining proper registration between the tracker bar and the player roll;

FIGURE 10 is a plan view showing the wind and rewind roll mechanism;

FIGURE 11 is a cross sectional view taken along the lines 11—11 of FIGURE 10;

FIGURE 12 is a schematic diagram of the electrical circuit used in this invention;

FIGURE 13 is an enlarged view of an edge of a player roll, and

Figure 14:
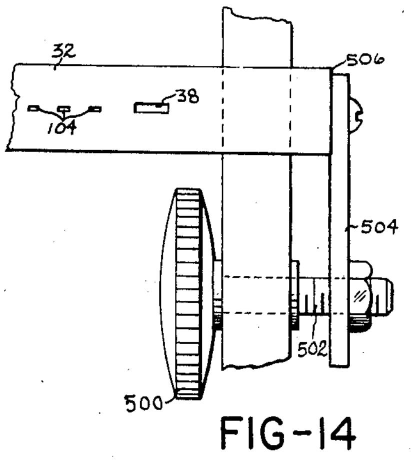

FIGURE 14 is a view showing another arrangement pertaining to the tracker bar in which manual adjustment thereof is effected.

GENERAL DESCRIPTION

This invention relates to an improved player piano unit which can readily be incorporated in standard piano models due to the compactness and reliability of the various components in the unit.

A source of vacuum for operating the pneumatics is provided by a vacuum pump driven by an electric motor. The source of vacuum is connected to vacuum chests on which the pneumatics and the valves for controlling the pneumatics are compactly located. Suitable conduits connect the valves with the pertaining opening in the tracker bar.

The tracker bar and the player roll are kept in proper registration by laterally shifting the tracker bar which is controlled by a pair of pneumatics. The player rolls have individual motors for winding and rewinding which make for simple positive control.

When a perforation in the player roll comes into registration with the pertaining aperture in the tracker bar, the pertaining valve is actuated which in turn controls a pneumatic which actuates a rod to strike the pertaining key.

When the player roll is rompletely played, an opening in the player roll activates the re-roll mechanism. When the entire player roll is rewound, the entire player unit is automatically shut off.

DETAILED DESCRIPTION

Figure 1:
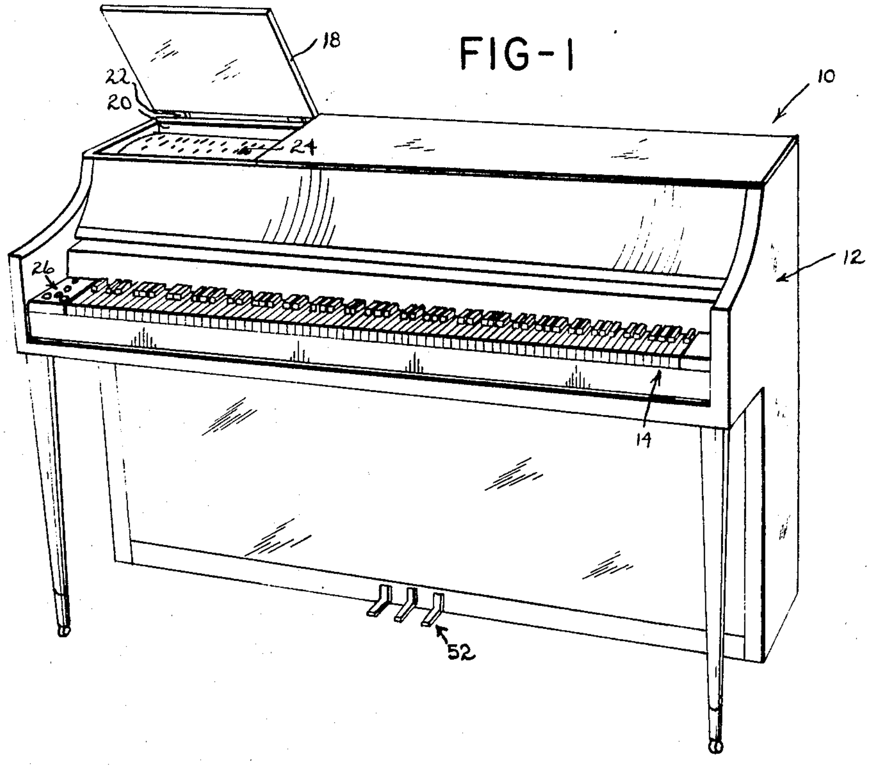
FIGURE 1 is a front perspective view of the player piano showing the piano keyboard and location of the player rolls.

Referring to the drawings more in detail, FIGURE 1 shows a player piano generally designated 10 having a cabinet 12. A keyboard 14 having a plurality of keys thereon for manual playing of the piano is also shown.

At the top left portion of the cabinet, there is a cover 18 which is hinged to the back panel 20 by hinge means 22. The player rolls generally designated 24 are shown in the compartment under the hinged lid 18. The controls generally designated 26 for operating the player piano are shown at the left side of the keyboard.

Figure 2:
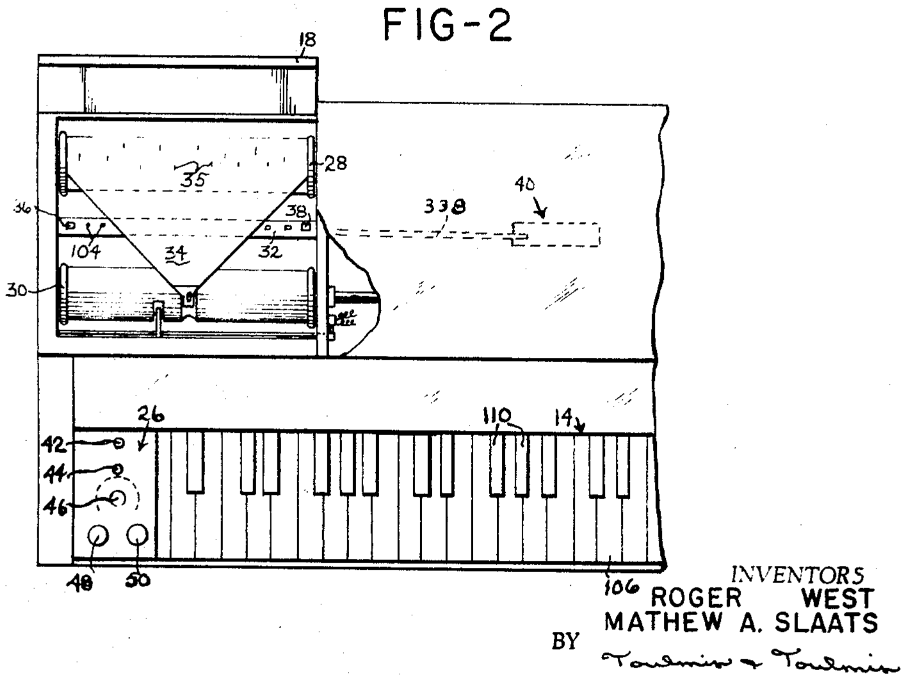
FIGURE 2 is a top portion of the piano showing player roll in position and the controls for the player piano unit.

Referring to FIGURE 2 the player roll rolls 24 include a rewind roll 28 and a wind roll 30 and between these rolls the tracker bar 32 is positioned. The paper roll 34 having the usual perforations therein passes over the tracker bar 32. In addition to the usual apertures appearing in the tracker bar, there are two additional apertures 36 and 38 which are utilized in connection with a follower unit generally designated 40 which maintains the tracker bar and the player roll in proper registration.

In this invention the rewind roll 28 does not shift laterally as in prior art models; however, the tracker bar 32 is shifted laterally to maintain proper registration between the paper roll 34 and the apertures of the tracker bar. The method of maintaining proper registration is obtained through using a follower unit 40, which is adaptable for shifting the tracker bar laterally in response to lateral shifting of the player roll edges. This feature will be discussed in detail later.

The controls for the player unit are located in the control box generally designated 26 and include the following: there is an off-on switch 42 for creating a ukulele effect with the piano. The volume of the player piano unit is controlled by a switch 44 and the tempo of the unit is controlled by a switch 46. Button 48 is the start button and button 50 is the stop button, all of which controls will be subsequently described. The usual loudness pedals 52 are shown for manual operation of the piano.

Figure 3:
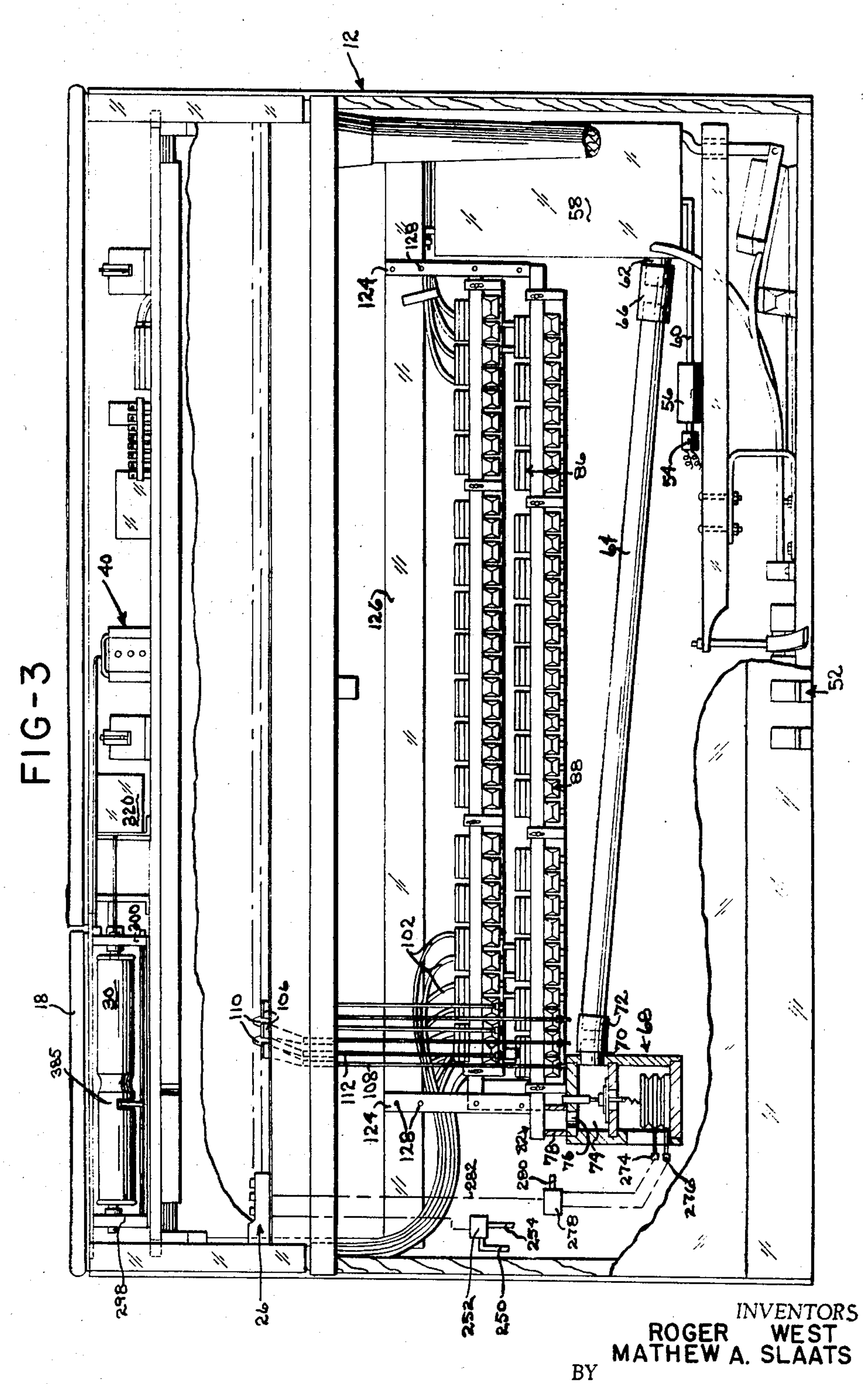
FIGURE 3 is a front elevational view showing the pneumatic system.

FIGURE 3 shows the general layout of the valves, vacuum chests and pneumatics used in this invention. Located inside the cabinet 12 there is an electric motor 54 which is used to drive a vacuum pump 56, which, in turn, is operatively connected to a vacuum chamber 58 by a suitable conduit 60. The vacuum chamber 58 has a nipple 62 thereon which is used to connect the chamber to a suitable conduit 64 by a flexible sleeve 66. While the drawings show the motor 54 and vacuum generator 56 as being outside the chamber 58, this is merely for ease of illustration. In the actual embodiment, these units are located inside chamber 58 which is soundproofed.

The other end of the conduit 64 is connected to the volume regulator generally designated 68 by an extension 70 on the regulator 68 which is connected to the conduit 64 by a suitable flexible sleeve 72. The volume regulator 68 has an upper chamber 74 which is connected to the vacuum chamber 58, as previously explained.

The volume regulator has a port 76 in the upper chamber 74 and a suitable conduit 78 connects port 80 in the vacuum chest generally designated 82 with the vacuum chamber 74, as better seen in FIGURE 5. The vacuum chest 82 extends horizontally in the piano, as shown, and is constructed to provide a chamber 84 therein.

The valve members generally designated 86 are secured on the top of the vacuum chest and the pneumatics generally designated 88 for actuating a selected range of keys on the keyboard are mounted on the underside of the vacuum chest. The lower vacuum chest 82 has a port 90 therein which opens into a conduit 92. A port 96 is present in the upper vacuum chest generally designated 98 and communicates with a chamber 100 therein. By this construction, a source of vacuum is connected to the lower vacuum chamber 84 and the upper vacuum chamber 100 and the valve members and pneumatics are conveniently and compactly located on the pertaining chests.

Each of the valve members 86 has conduits 102 connected thereto and the conduits are connected at the other end to the appropriate apertures 104 in the tracker bar 32.

The lower level of pneumatics 88 is connected to the selected range of white keys 106 on the keyboard by push rods 108 as shown in FIGURE 3. The selected range of black keys 110 on the keyboard is operatively connected to the upper row of pneumatics 88 by push rods 112.

Each of the vacuum checks is constructed of an upper planar member 114 and a lower planar member 116 which extend for the length of the chest and side members 118 and 120 which also extend for the length of the chest. Suitable end members 122 are used to close the ends and thereby create the upper and lower vacuum members.

The upper and lower vacuum chests are suitably secured to a bracket 124 which is secured to cross member 126 by suitable fasteners 128. The cross member 126 is suitably secured to the inside of the piano cabinet 12.

Bracket 124 has a suitable aperture 130 therein through which the conduits 102 are passed, as shown in FIGURE 5.

GENERAL CONSTRUCTION OF THE PNEUMATICS

Each of the pneumatics generally designated 88 has an upper stationary leaf 132 which is suitably secured to the lower side of the pertaining chest as by gluing. Each pneumatic also has a lower movable leaf 134 and suitable collapsible bellows 136, as shown in FIGURE 6.

The movable leaf 134 has an extension 138 suitably retained thereon which is operatively connected to the pertaining push rod 108 or 112. Each of these push rods has a fastener 140 which has a locater element 142 secured thereto, as shown in FIGURE 6. Fastener 140 has internal threads which mate with threads on the push rods to provide an adjustment in the length of the rod. The lower end of each rod is inserted in an aperture in the pertaining extension 138.

The pneumatics 88 are supported in the expanded position by a bracket 144 which is secured to the pertaining vacuum chest by fasteners 146. The lower end of the bracket 144 has an angle iron 148 which extends for the length of the vacuum chest and on top of the angle iron 148, there is glued some cushion material 149 to eliminate noise in the operation of the pneumatics.

VALVE ASSEMBLY CONSTRUCTION

FIGURES 7 and 8 show the general construction of the valve assemblies 86. Each of the valve members consists of a top plate 150, a center plate 152, and a bottom plate 154, which are all made out of molded plastic and are secured together by gluing. This construction provides for a simple, reliable, and low cost unit.

Each valve assembly 86 is used in conjunction with a pair of pneumatics which are placed on the underside of the pertaining valve chest and under the pertaining valve assembly. Each of the valve assemblies has two valve members therein; valve member generally designated 156 controls the left pneumatic when viewing the bellows as seen in FIGURE 8, and valve member 158 controls the right pneumatic.

The construction of the individual valve members 156 and 158 is the same and a discussion of valve member 158 will follow.

The valve member generally designated 158 has a port 160 located in the top plate 150 and a felt washer 162 is positioned over the port as shown in FIGURE 8. Port 160 communicates with the atmosphere and with passage 164 which is located in the top plate 150. At the right side of FIGURE 8 passage 164 communicates with an aperture 166 which is located in the center plate 152. A passage 168, which is similar to passage 164, connects with valve member 156 with the atmosphere and aperture 170 which is located in the center plate 152.

Adjacent to the port 160 in the right valve member 158 there is formed an annular upper seat 172 which is one of the seats against which the blade member 174 seats. The center plate 152 has a port 176 therein and an annular groove is formed around this port to produce an annular lower seat 178 upon which the valve blade 174 normally rests.

A suitable stem 180 with a collar 182 are inserted through an aperture in the valve blade 174 and secured thereto by gluing. The upper portion of the stem as at 184 pases through a hole in the washer 162. The collar 182 has a diameter smaller than port 176 as shown.

A valve diaphragm 186 is positioned in an annular recess 188 formed in the upper surface of the bottom plate 154. A groove 190 is cut on the lower side of center plate 152 to form a depending flange 192 which retains the diaphragm 186 in the area of passage 198.

A suitable port 194 is formed in depending flange 192 as shown. By this construction an upper chamber 186 is formed above the diaphragm 186 through port 194 and passage 198 the upper chamber is in communication with a port 200 which is formed in the bottom plate 154. The port 200 communicates with the vacuum chest 100 as shown in FIGURE 6. Port 200*a* is the same as port 200 but it is shown somewhat displaced in the lower valve unit in FIGURE 6. By this construction the upper chambers 196 of valve members 156 and 158 are operatively connected with the pertaining vacuum chest.

At the right side of the valve assembly as shown in FIGURES 7 and 8 there is a coupling member 202 which has tubular extensions 204 and 206 extending upwardly as shown. The pertaining conduit 102 from the tracker bar 32 is positioned on the pertaining tubular extensions 204 and 206. A tubular insert or sleeve 208 is inserted through port 167 in the bottom plate 154, which port is aligned with port 166 and communicates at one end with the pasage 210 in the tubular extension 204.

The inward end of insert 208 communicates with passage 212 which is formed in the lower plate 154 and passage 212 is joined in the lower chamber 214 which extends below the diaphragm 186. A passage 216 is used to connect the tubular extension 206 with the pertaining lower chamber 214 of the left hand valve member 156.

By this construction the lower chamber 214 of each valve member is connected to a pertaining conduit 102 leading to the tracker bar 32. Also the upper chambers 196 of each valve member are connected to the pertaining vacuum chests. The upper and lower chambers of each of the valve members are interconnected by a bleed hole 218 which is in the bottom plate 154. Passage 164 is in communication with sleeve 220 which is positioned in the bottom plate 154 and connects passage 164 with the pertaining right pneumatic. Instead of using a sleeve 220, the passageway may be formed in the valve member parts by simply gluing them together and forming the passageway therein as was done with passages 200 and **200*a***.

OPERATION OF THE VALVE ASSEMBLY

The operation of each valve unit is as follows:

Since the lower chambers 214 are connected with a source of vacuum, the valve blade 174 normally rests upon the lower annular seat 178.

When an aperture 35 in the player roll 34 comes into registration with the pertaining opening 104 in the tracker bar 32 a supply of air from the atmosphere is introduced to the lower chamber 214 as previously mentioned. This causes the valve blade 174 to be pushed upwardly and to rest against the upper annular seat 172, thereby closing off port 160 and passage 164 to the atmosphere. With the blade 174 in the raised position, a source of vacuum is connected to passage 164 via port 176 and this source of vacuum is delivered via passage 164 and sleeve 220 to the pertaining pneumatic 88.

When the aperture 35 passes over the pertaining opening in the tracker bar the supply of air to conduit 102 is cut off and accordingly the valve blade 174 drops to its position on the lower seat 178. By similar action when the left valve member 156 is actuated a source of vacuum is supplied through passage 168, ports 170 and 171, and conduit 222 to connect the source of vacuum with the pertaining pneumatic for actuating the left pneumatic as shown in FIGURE 6. The conduit 222 may be eliminated, leaving a passageway similar to 200.

FIGURE 4 shows how the actuator rods 108 and 112 are operatively connected to the pertaining keys on the keyboard. Actuator rod 108 rests against the lower portion of a white key 106. A suitable cushion member (not shown) may be positioned between the lower surface of the key and the actuator rod to eliminate noisy operation of the rods. The key 106 is operatively connected to the hammer assembly generally designated 226 by a wippen 228 and standard linkage as shown. When the actuator rod 108 is pushed upwardly the hammer 230 hits the pertaining string 232.

UKELANO EFFECT

This invention further comprises means for obtaining a Ukelano effect with the player unit. The Ukelano unit 234 shown schematically in FIGURE 4 is positioned to lie between the strings 232 and the hammer 230 when the Ukelano effect is desired. The Ukelano attachment 234 is supported by spring means 236 which are secured to each side of the piano by a bracket 238.

From the lower side of the attachment there is a rod or cable 240 which connects the attachment to a movable leaf 242 of a pneumatic generally designated 244. The lower leaf 246 is secured to the side wall of the piano by a bracket 248. There is a similar arrangement on the opposite side of the piano. A suitable conduit 250 connects the pneumatic to a valve member 252 schematically in FIGURE 3. The valve member 252 is operatively connected to the off-on switch 42 on the control panel 46 and is also connected to the vacuum chamber by a suitable conduit 254. The valve permits air to enter the pneumatic when in the off position.

When actuating the valve member 252 to the "on" position, a source of vacuum is supplied through the conduit 250 to each of the pneumatics 248 and the movable leaves 242 are pulled downwardly to bring the Ukelano attachment into position between the hammer 230 and the strings 232. Upon shutting off the source of vacuum the atmosphere is admitted to conduit 250 and the spring member 236 raises and removes the Ukelano attachment from between the hammer and strings. The construction of the Ukelano attachment is of standard design and does not form a part of this invention.

FIGURE 4*a* is a second embodiment of the means for obtaining a Ukelano or Rinky Tink effect. In this embodiment, the pneumatic 244 is positioned on top of the rectangular conduit means 392 shown in FIGURE 4, and the lower leaf 246 is the stationary leaf with the movable leaf having an extension 242 thereon. There is one such pneumatic positioned on each side of the piano and a horizontal Ukelano rail 410 is secured to the underside of the leaves 242 as shown. A suitable compression spring 412 is positioned between the upper and lower leaves as shown and acts to raise the movable leaf when the atmosphere enters the pneumatic. When it is desired to use the Ukelano effect, valve member 252 is moved to the "on" position to connect line 250 to a source of vacuum. The vacuum pulls the movable leaf down against the spring 412 and moves the attachment 234 into position between the hammers 230 and strings 232. The Ukelano attachment 234 is secured to the Ukelano rail 410.

PLAYER PIANO LOUDNESS CONTROL

This invention also includes a player piano loudness control device which is generally indicated as 68 and is shown in detail in FIGURE 5. The device used in this invention is such that the vacuum in the various vacuum chests can be controlled by varying the spring tension of a relief valve by means of a remotely controlled mechanism.

The loudness control device consists of a cylindrical sleeve 256 which has a lower closure 258 and an upper closure 260 for closing the ends of the sleeve. A double pneumatic generally designated 261 has a stationary leaf 262 which is suitably secured to the bottom closure 258 as by gluing.

The pneumatic also includes an upper movable member 264 and an intermediate movable leaf 266, which members are enclosed in a suitable bellows 268 as shown to provide a first chamber 270 and a second chamber 272, in the pneumatic. Suitable conduits 274 and 276 connect the chambers 270 and 272, respectively, with a valve member 278 as shown in FIGURE 3. The valve member 278 is a standard three-position valve having an off position in which none of the conduits 274 and 276 is connected to the vacuum chamber 58 but are connected to the atmosphere. In a first position the chamber 270 is connected to the source of vacuum via conduits 280 and 274 and in a second position the chamber 272 is connected to a source of vacuum via conduits 280 and 276.

The valve member 278 is connected by a suitable shaft means 282 to the volume switch 44 shown in FIGURE 2 and conduit 280 is connected to the vacuum chamber 58.

The upper movable leaf 264 of the regulator is connected by spring means 284 to a stem 286 which slides in a sleeve 288 which is inserted in the top closure member 260. The stem 286 also passes through the port 290 which is located in the valve seat 292 and the top of sleeve 288 is closed to the atmosphere.

A suitable valve blade 294 is welded to the stem 286 and a suitable sealing gasket 296 is placed under the blade and rests upon the valve seat 292.

Normally the chamber 74 in the control device 68 has sufficient vacuum to lift the blade 294 off its seat, permitting chamber 74 to be in partial communication with the atmosphere through an opening 297. If additional loudness is required in playing the piano, which would necessitate a higher degree of vacuum in chamber 74, the volume switch 44 may be rotated to the first position to collapse chamber 270. Collapsing of chambers 270 or 272, if desired, bring about a greater tension on spring 284 which increases the vacuum in chamber 74. By this method the vacuum inside the various vacuum chests is regulated.

DRIVE MECHANISM FOR THE PLAYER ROLLS

FIGURE 10 of the drawings shows the method of mounting and driving the rewind and wind rolls of the player unit. The player piano of this invention is equipped with two separate electric motors, one for forward and one for rewind, each having its appropriate gear reductions to obtain the proper speeds. The motors are of such a construction that upon deactivating the motors from a power source, the armatures thereof are disconnected and the gears are allowed to turn freely. This system lends itself to a very simple wind and rewind arrangement for player pianos. The result is a very simple and reliable mechanism that is low in cost and which is controlled by a relay.

Referring further to the drawings, in FIGURES 9 and 10 there is shown a stationary frame which might take the form of upright members 298 and 300 which are secured to a support member 302, which in turn is secured to another support member 304 having its end suitably secured to the sides of the piano cabinet. The wind roll 30 has a shaft 306 which is rotatably mounted in the upright frame members 298 and 300 and is secured therein by locking collars 308.

The roll 30 has flange means 310 thereon between which the edges of the player roll are guided. The rewind roll is supported on shaft members 312 and 315. Shaft member 312 is part of a standard coupling 313 which is secured to the upright member 298 and is spring loaded to urge the shaft 312 toward the right as shown in FIGURE 10. The shaft member 312 can be pushed to the left to permit the introduction of a player roll. The right side of the player roll is supported on a shaft 315 which has a curved tip blade portion 314 on the end thereof to drive and support the player roll. The shaft 315 is suitably mounted in a standard mounting 317 which prevents axial movement of the shaft 315.

The rewind motor 318 is operatively connected to the shaft 315 by a coupling member shown schematically as 319. This coupling member could include the gear reduction unit mentioned earlier and the means for disconnecting the armature of the rewind motor when the motor is de-energized. In the specific embodiment, the gear reduction unit is part of the motor 318. Suitable leads connect the rewind motor to a source of electricity.

The play motor 320 is operatively connected to the shaft 306 through a coupling member shown schematically at 322 which is similar to the coupling member 319. The play motor which is a standard motor such as one manufactured by Brevel lends itself to a very simple speed control which is especially desirable in the wind operation.

The motor 320 produces a variable forward speed that can be controlled by a simple variable resistor. The principle of this speed control is that in addition to the 60 cycle AC current fed into the field, a varying amount of DC voltage is fed into the same field as shown in FIGURE 12. In this drawing the field 324 has a variable resistor means 326 in series therewith and a diode 328 is connected across the resistor 326 as shown. Resistor means 326 includes a slide resistor E2 and a second slide resistor R1 in series therewith. When the resistor setting is at its lowest value, the greatest current flows through the resistor branch to the motor for maximum speed. As the resistor setting is increased, more current flows through the diode branch which suppresses a half cycle of the current to reduce the current to the motor for reduced speed thereof.

FOLLOW-UP MECHANISM FOR PROPER TRACKING

The follow-up device for the tracker bar 32 is shown in detail in FIGURE 9. The tracker bar is supported at its ends by L-shaped spring members 330 which have the short ends secured to the underside of the tracker bar by fasteners 332. The lower ends of the springs are secured to a spacer 334 by fasteners 336. The spacers 334 are conveniently secured to the pertaining upright members 298 and 300 as by gluing.

The tracker bar 32 is operatively connected to the follow-up device generally designated 40 by a rod 338 which is secured to one end of the tracker bar and has nut means thereon for adjusting the length of the rod 338 as shown at 340.

It is important in a player piano to have the sensing device or tracker bar in good registration with the perforations of the music roll. In the normal process of winding and rewinding, the paper will wander slightly laterally because of slight imperfections in the paper and the width of the roll. It is necessary, therefore, to have a control mechanism which will maintain the player roll in proper registration with the tracking bar. For this purpose two elongated holes 36 and 38 have been made in the tracker bar and they are in turn connected by suitable conduits to the dual pneumatics shown in FIGURE 9.

These pneumatics consist of movable leaves 342 and 344 which are encased in a bellows 346. A center stationary leaf 347 is provided and two chambers 348 and 350 are thereby provided.

Conduit 352 connects with the right hand elongated hole 38 and is passed through an opening 354 into conduit 356 and out opening 358, after which the conduit 352 passes through a re-entry hole 360. The conduit 352 is then connected to a tubular sleeve member 366 which communicates with the left chamber 348. Conduit 364 is connected with the left hand elongated hole 36 of the tracker bar and follows a similar route through the various openings mentioned and is connected at its extremity to a tubular sleeve 362 which is connected to the right chamber 350.

The stationary leaf 347 has a T-shaped tubular sleeve 368 therein, which at one end is connected to a conduit 370 which leads to the vacuum chamber 58. There are bleed hole members 372 and 374 provided in the tubular sleeve 368 to permit vacuum to be bled into each of the pneumatic chambers.

The rightmost end of the rod 338 as shown in FIGURE 9 has a right angle bend 376 therein which is secured to a rod 378 as shown. The extremities of the rod 378 fit into recesses in the movable leaves 342 and 344. An additional rod 380 also similarly fits into appropriate recesses in the movable leaves as shown.

Operation of the follow-up device is as follows:

Normally when the player roll is properly registered in the rolls, the edges of the roll only partially equally cover the apertures 36 and 38 and a condition of equilibrium is reached in both pneumatics with air coming into each of the pneumatics.

Assuming that the player roll 34 shifts to the left it would cover the elongated hole 36. Upon covering the hole 36 the source of air, which normally comes through the holes when the roll is in proper registration with the tracker bar, is shut off and an increase in vacuum occurs in chamber 350 through the bleed hole member 374.

This action tends to collapse the chamber 350, which in turn pushes the rods 338 and 380 to the left, producing the appropriate correction. The operation for making a rightward correction is similar.

In normal usage the edges of the player piano rolls often become damaged through rough handling or through the control mechanism being out of proper adjustment. The damaged edges of the paper roll impair tracking of the player roll on subsequent usage. The edges of the player rolls may be covered by a tape 381 such as Mylar to prevent such damage as shown in FIGUURE 13.

It is, of course, possible to hold the tracker bar stationary and to provide a manual adjustment therefor if desired.

CONTROL AND ELECTRIC CIRCUIT

The controls for operating the various functions of the player piano of this invention have been located at the left end of the keyboard for maximum convenience and compactness. In starting the player piano mechanism, the start button 400 (FIGURE 12) is depressed, putting the entire mechanism into operation. It is assumed that the player roll has been placed in the proper position on rewind roll 28 and the lead end of the player roll has been attached to the wind roll 30.

Upon pressing of the start button 400, a relay 402 is energized to energize motor 54 driving the vacuum supply means and to start the play motor 320. Upon pressing the stop button 404 the mechanism stops and the rewind cycle is started automatically. The rewind cycle is terminated by actuation of a switch which occurs when all of the paper has been removed from the wind-up roll.

This latter switch is preferably a mechanical switch such as 382 shown in FIGURES 10 and 11. The switch is mounted on frame 300 and is actuated by a linkage which includes an element 383 which can drop into groove 385 of roll 30. When the paper web of a player roll is connected to roll 30 and is wound up on the roll a predetermined amount, the paper will engage element 383 and move the linkage connected thereto so as to close switch 382. During rewinding of the player roll, when it is rewound to the point that the tapered lead end of the paper roll commences to expose wind roll 30, before the lead end of the paper roll becomes detached from roll 30, groove or notch 385 of roll 30 will become uncovered and element 383 will drop therein thus permitting switch 382 to open and to interrupt the rewinding operation. The operation will come to a halt with substantially the entire paper player roll rewound and with only the tapered lead end thereof connected to roll 30.

FIGURE 11 also shows suitable dividers 388 to protect the various conduits leading from the tracker bar. The arcuately shaped divider 390 is primarily decorative.

In leading the various conduits to the pertaining sides of the piano suitable rectangular conduit means 392 such as shown in FIGURE 4 can be used.

Referring more particularly to the electrical circuit of FIGURE 12, one side of the actuating coil of relay 402 is connected to one prong or plug 406. The same side of the actuating coil of relay 402 is connected through a neon signal light 408 with wire 410 leading to one side of a main switch 412, the other side of which is connected to the other prong of plug 406. The said other prong of plug 406 which is connected to wire 414 leads to one side of motor 54 which drives the vacuum pump. The other side of this motor is connected through the parallel arranged relay blades generally indicated at 416 to the other prong of plug 406 which is connected to wire 418.

Wire 410 is connected with one side of start switch 400 the other side of which is connected with the side of the actuating coil of relay 402 opposite the side that is connected to wire 418. Stop switch 404 is normally closed and is arranged in series with the actuating coil of relay 402.

Wire 410 also leads to one of a pair of relay controlled blades 420, the other blade of which is connected with one side of a pair of vacuum controlled switches 422 and 424. The other sides of the vacuum controlled switches are connected with the side of the actuating coil of relay 402 to which start switch 400 is connected. The last-mentioned circuitry thus constitutes a holding circuit for relay 402.

Switch 422 is normally open and is adapted for being closed by a pneumatic operator 426 when this operator is subjected to suction from the vacuum chest. This suction is applied via a restrictor 428 so that there will be a certain delay in the build-up of vacuum in pneumatic 426. Leading from pneumatic 426 is a tube 430 that terminates in a port on the tracker bar that is normally covered throughout the playing of a player roll. In the terminal end of each player roll, however, a slot is provided which will expose the hole in the tracker bar to which tube 430 is connected so that at the end of a player roll, the suction in pneumatic 426 will be relieved and switch 422 will open and this will effect de-energization of relay 402 and stop the play cycle.

Switch 424 is in parallel with switch 426 and is normally closed and is adapted for being opened by a pneumatic operator 432 which has suction drawn thereon from the vacuum chest via a restrictor 434.

Wire 418 has connected thereto a wire 436 which leads through a fuse 438 to a movable blade 440 of a switch having stationary blades or contacts 442 and 444. Blade 440 is normally in engagement with blade 442 but has connected thereto a pneumatic operator 446 which is subjected to suction from the vacuum chest via a restrictor 448. Blade or contact 444 is connected to one side of play motor 320, the other side of which is connected by a wire 450 with one end of a resistor branch 452 which is connected parallel with a diode branch 454. The other side of this parallel circuit is connected by wire 456 with wire 410 leading back to plug 406. The resistors of resistor branch 452 are adjustable to vary the speed of operation of the play motor. When the resistor setting is low, most of the current to motor 320 passes through the resistor side of the circuit and the motor operates at maximum speed. When the resistor setting is increased, most of the current passes through the diode branch which will operate a half cycle of the current and thereby reduce the supply of current to motor 320, thereby causing it to operate at reduced speed.

The blade or contact 442 is connected with one side of re-wind motor 318 through a normally closed switch 458. Normally closed switch 458 has a pneumatic operator 460 connected with the vacuum switch so that when the vacuum in the chest is developed, switch 458 will open.

The other side of re-wind motor 318 is connected with a stationary contact 462 of switch 382 which includes movable switch blade 464 adapted for engaging another fixed contact 466. When element 383 is elevated by the paper of a player roll, blade 464 is closed on contact 462, but when element 383 drops into notch or groove 385 of roll 30, blade 464 will be moved into contact with blade 466.

Blade 464 is connected by a wire 468 with wire 456. Contact 466 is connected by a wire 470 through a selector switch 472 with the end of the actuating coil of relay 402 to which start switch 400 is connected.

In operation, assuming a player roll is in position and with the lead end thereof connected to roll 30 and with switch 412 closed, a play cycle is initiated by closing switch 400 which will energize relay 402 to close the blades thereof. The closing of blades 416 will energize vacuum motor 54 and commence to develop vacuum in the vacuum chest and connected system. At this time, there is no operation of motors 318 and 320 because the circuits to both thereof are open. The circuit to motor 320 is open because of the position of switch blade 440 which will only move into effective position when the vacuum is built up, and blade 464 is positioned to open the circuit to motor 318 because the paper of the player roll has not yet advanced to the point where it will lift element 383.

As soon as vacuum builds up in the system, however, pneumatic 446 will shift blade 440 into engagement with contact 444 and pneumatic 460 will move blade 458 to open position. With the switches thus shifted, play motor 320 will commence to run and the player roll will advance. As the tapered lead end of the paper roll winds up on roll 30, element 383 will be lifted and blade 464 will move into contact with fixed contact 462 in the circuit to rewind motor 318. At this time, however, blade 458 is open and blade 440 is shifted away from contact 442 so that the rewind motor remains idle.

As the paper roll advances over tracker bar 332, it will cover up the hole in the tracker bar, usually near one extreme side edge of the paper of the roll, which is connected to conduit 430 and this will permit development of suction in pneumatic 426 which will close switch 422 and thereby provide a holding circuit for relay 402.

The feeding of the paper roll across the tracker bar now continues at the speed determined by the setting of resistors in resistor branch 452 until the paper roll advances to the point that a slot in the terminal end thereof uncovers the port in the tracker bar that is connected with conduit 430. When this occurs pneumatic 426 is released and switch 422 opens, and relay 402 is de-energized and its blades 416 and 420 drop open. The vacuum motor 454 is now de-energized and vacuum decays in the system so that switch 458 will close and switch blade 440 will move into position to engage contact 442. The movement of these switches completes a circuit to rewind motor 318 while the circuit to motor 320 is interrupted and the paper roll will now be rewound. When the paper roll is rewound to the point that only the tapered leading end thereof is attached to roll 30, notch or groove 358 of roll 30 will be uncovered and element 383 will drop therein moving switch blade 464 away from contact 462 and into engagement with contact 466, thus interrupting the circuit to rewind motor 318 and terminating the rewinding operation. The mechanism will now come to a halt unless switch 472 is closed to cause a repeat operation. As switch 472 is closed relay 402 will again be energized and a play cycle will again be initiated utilizing the same player roll. The aforementioned switch 424, which is in parallel with switch 422, is provided so that relay 402 will be held immediately upon depressing of start switch 400 and until the vacuum can be built up in the system and the player roll advanced to the point that switch 422 closes. To this end, the build up of vacuum in pneumatic 432 is delayed so that it will only be open under normal circumstances after the player roll has advanced a predetermined distance over the tracker bar. It will be obvious that switch 424 could be eliminated as start switch 400 is held depressed until the paper roll advances far enough to permit switch 422 to close.

It has been mentioned that the tracker bar is automatically adjustable by a pair of oppositely acting pneumatics connected thereto, but it has been found in practice, with precision manufacture of the rolls and the circuits therefor and with properly perforated paper player rolls, the tracker bar can remain stationary. Even under these circumstances, however, adjustment of the tracker bar is advisable and an arrangement for accomplishing this is shown in FIGURE 14. In this figure knurled knob 500 adjusts screw 502 which is threaded to a blade 504 operatively engaging the end of tracker bar 506. Adjustment of screw 502 by availing of knob 500 will shift the tracker bar to bring it into proper registration with the perforations in the paper player roll, if such adjustment is necessary.

What is claimed is:

1. In a player piano having a cabinet and a keybed therein supporting keys for manual operation and having an automatic playing mechanism, said cabinet having a hinged compartment in the top thereof in which a portion of said playing mechanism is housed, said portion comprising; a tracker bar shiftably mounted in said compartment and having a plurality of holes adapted to be covered and uncovered by a player roll having selected perforations therein, means to shift said tracker bar laterally to maintain said tracker bar in registration with said player roll, a winding roll and a rewind roll mounted in said piano to receive said player roll, a separate driving motor for each of said winding and rewind rolls, and upper and lower vacuum chests horizontally mounted in said cabinet below and inwardly of said keyboard, a plurality of pneumatics corresponding in number to a selected range of keys to be operated automatically and mounted on the undersides of said vacuum chests with those on the lower chest staggered relative to those on the upper chest, said pneumatics each comprising a fixed leaf and a movable leaf, actuator rod means for each pneumatic operatively interposed between the movable leaf of the respective pneumatic and the pertaining key, a plurality of pressure actuated valves operatively connected to said pneumatics and said vacuum chests to individually control the withdrawal of air from said pneumatics, said valves being mounted on top of the pertaining vacuum chest, a frame supporting said vacuum chests and adapted to be installed as a unit in said cabinet, a plurality of tubes connecting individual ones of said valves to corresponding holes in said tracker bar, vacuum pump means operatively connected to said vacuum chests, relief valve means operatively connected between said vacuum pump means and said vacuum chests to control the degree of vacuum in said chests for controlling the loudness of the playing mechanism, and control means mounted at one end of said keyboard and operatively connected to said driving motors for said wind and rewind rolls and to said vacuum pump means and in controlling relation to said relief valve means.

2. In a player piano having a cabinet and a keyboard therein supporting keys for manual operation and having a compartment recessed into the top thereof in which a portion of said playing mechanism is housed, said portion comprising: a frame, a tracker bar in the frame and a winding roll and a rewind roll in the frame on respectively opposite sides of said tracker bar and having their axes parallel to the length of said tracker bar, said tracker bar having a plurality of holes adapted to be controlled by a perforated player roll leading between said winding and rewind rolls, means to shift said tracker bar and at least one of said winding and rewind rolls relatively in the direction of the length of said tracker bar to maintain said tracker bar in registration with said player roll, motor means for driving said winding and rewind rolls; upper and lower vacuum chests horizontally mounted in said cabinet below and inwardly of said keyboard, a plurality of pneumatics corresponding in number to a selected range of keys to be operated automatically and mounted on said vacuum chests with those on the lower chest staggered laterally relative to those on the upper chest, said pneumatics each comprising a fixed leaf and a moveable leaf, actuator rod means for each pneumatic operatively interposed between the moveable leaf of the respective pneumatic and the pertaining key, a plurality of pressure actuated valves operatively connected to said pneumatics and said vacuum chests to individually control the withdrawal of air from said pneumatics, said valves being mounted on the pertaining vacuum chest, a frame supporting said vacuum chests whereby said vacuum chests and the pnematics and valves mounted thereon are adapted to be installed as a unit in said cabinet, a plurality of tubes connecting individual ones of said valves to corresponding holes in said tracker bar, vacuum pump means operatively connected to said vacuum chests, control valve means operatively connected between said vacuum pump means and said vacuum chests and operable to control the degree of vacuum in said chests for controlling the force exerted on said keys by said pneumatics, and control means mounted at one end of said keyboard and operatively connected to said motor means for said wind and rewind rolls and to said vacuum pump means and in controlling relation to said control valve means.

3. In a player piano having a keyboard supporting keys for manual operation and having an automatic playing mechanism comprising: tracker bar having a plurality of holes adapted to be covered and uncovered by a player roll having selected perforations therein, a plurality of pneumatics corresponding in number to a selected range of keys to be operated automatically and supported in said piano, said pneumatics each comprising a fixed leaf and a moveable leaf, actutor rod means for each pneumatic which is operatively interposed between the moveable leaf of the respective pneumatic and the pertaining key, a pair of horizontally extending vertically spaced vacuum chests supported in said piano, a plurality of pressure actuated valves operatively connected to said pneumatics and said vacuum chests to individually control the withdrawal of air from said pneumatics and supported on said vacuum chests, a plurality of tubes connecting individual ones of said valves to corresponding holes in said tracker bar, vacuum pump means operatively connected to said vacuum chests, said pneumatics being supported on said vacuum chests and those supported on the upper chest being staggered relative to those on the lower chest, a cylindrical body having a top closure and a bottom closure therefor, a divider member positioned in said cylindrical body between said closures to form a first upper and a second lower chamber and also having an aperture therein, a valve member in said first chamber adapted to close said aperture in said divider member, a spring connected at one end to said valve member to urge it toward aperture closing position, said cylindrical body having a first passage therein to connect said second chamber with the atmosphere, said cylindrical body having a second passage therein in communication with said vacuum pump means and said first chamber, said top closure having a passage therein in communication with said vacuum chests and said first chamber, and two bellows means connected in tandem between the end wall of said second chamber and the other end of said spring and adapted to be subjected to suction to increase the tension on said valve member and means for selectively subjecting said bellows means to suction to adjust the degree of suction required in said first chamber to lift said valve member off said divider member.

4. The apparatus as claimed in claim 3 in which said fixed leaf of each pneumatic is secured to the underside of a pertaining said chest and each said movable leaf has an extension thereon having a hole therein, the pertaining said actuator rod means having a lower end extending through said hole in said extension, and means adjustably mounted on said lower end of said rod means and resiliently engaging the upper side of said extension.

References Cited

UNITED STATES PATENTS

| | | | |
|---|---|---|---|
| 1,639,324 | 8/1927 | Austin | 84—157 |
| 1,813,097 | 7/1931 | Stoddard | 84—39 |
| 1,599,394 | 9/1926 | Cheek | 84—123 |
| 1,275,300 | 8/1918 | Peterson | 84—140 |
| 1,874,663 | 8/1932 | Verlinden | 84—123 |

STEPHEN J. TOMSKY, Primary Examiner

L. R. FRANKLIN, Assistant Examiner

U.S. Cl. X.R.

84—48, 79, 116, 122, 136